June 8, 1965  C. C. SMITH  3,187,433
METHOD OF TREATING EDENTULOUS TISSUE WITH A TREATMENT
COMPOSITION ON FUNCTIONALLY ALIGNED DENTURES
Filed April 2, 1963  2 Sheets-Sheet 1

INVENTOR.
Clark C. Smith
BY
Hovey, Schmidt, Johnson & Hovey
ATTORNEYS.

United States Patent Office 3,187,433
Patented June 8, 1965

3,187,433
METHOD OF TREATING EDENTULOUS TISSUE WITH A TREATMENT COMPOSITION ON FUNCTIONALLY ALIGNED DENTURES
Clark C. Smith, 126 E. Missouri, Kansas City, Mo.
Filed Apr. 2, 1963, Ser. No. 269,978
9 Claims. (Cl. 32—1)

This invention relates to the field of dental prosthetics and is concerned with a novel method for facilitating the use of tissue treatment material in the construction of dentures for a patient's edentulous ridges in a manner to assure that the functional relationship of the dentures, one to the other, will remain constant.

Artificial dentures have for many years been constructed by taking master impressions of the patient's edentulous ridges, followed by pouring of stone models of the impressions, and molding or casting the denture bases to conform to the surface configuration of the stone models. These master impressions have been taken by the use of a variety of materials including waxes, creams, alginate materials and others. The impressions have been taken, by the dentist, while the patient is in the dentist's office, thus resulting in the terminology "chair-side impressions." It has been the practice of the profession to then pour stone models into these impressions followed by constructing dentures that conform, as nearly as possible, to the surface configuration of the stone models. The limitations of this procedure are obvious when it is recognized that in nearly all cases the dentist is taking an impression of sick or damaged tissue in the mouth. In the case of "immediate dentures" this damaged tissue is the result of surgery. In cases where the patient is currently wearing ill-fitting and unsatisfactory dentures, the damaged tissue in the mouth is the result of uneven pressure caused by these ill-fitting dentures. A traumatic condition, or a condition of hypertrophy or hyperplasia, is commonly found in the mouths of patients who are wearing ill-fitting dentures. It becomes obvious, therefore, that when a "chair-side" master impression is taken of this sick and/or abused tissue, then duplicated in a denture, that the problem has not been solved but, instead, has been compounded. A further limitation of this procedure is the fact that these impressions are necessarily "static" impressions and at best will register only a few of the dictates of the muscles and other tissue of the mouth inasmuch as these muscles and tissue are not being used in a natural and normal and functional fashion during the impression technique. The results of such a procedure are, therefore, unsatisfactory when viewed in the light of this present invention.

It has heretofore normally been necessary for each patient to revisit the dentist a number of times after construction of the dental appliances, for the purpose of "adjustments" in an attempt to make the denture bases more comfortable to wear and use. In most instances, these adjustments consist of removing a portion of the inner surface and borders of the dental appliances which impinge on the patient's edentulous tissue and cause sore spots. The dentist observes the patient's gums for sore spots or reddened areas indicating excessive pressure, and then grinds or scrapes away a portion of the dental appliance that was located in overlying relationship to these zones of excessive impingement. The limitations of this procedure are readily apparent when it is recognized that by relieving certain portions of the dental appliance, the dentist is further destroying the accurate conformation of the denture base. Adjustments of this type are especially anomalous in view of the fact that the dentist previously went to great effort to obtain an accurate representation of the patient's edentulous ridges for use in constructing the appliances.

It is therefore the primary object of the present invention to provide an improved method of treating a patient's edentulous ridge tissue with a treatment composition on a denture base for the ridge in a manner to provide complete assurance that the denture base is properly positioned in the patient's mouth with the occlusal surfaces of the teeth on the denture base in true functional alignment with his opposing teeth.

Another important object of the invention is to provide a process for constructing dentures wherein the patient's edentulous tissue is restored to sound condition following extraction of his teeth, before taking of the final impressions precedent to fabrication of the dental appliances, by utilization of a treatment composition on the inner surface of temporary dentures, with improved procedure being applied to assure displacement of the treatment composition on the dentures in a location in the patient's mouth which assures proper positioning of the dentures in true functional relationship throughout the tissue treatment period.

Another very important object of the invention is to provide an improved method of constructing dentures wherein the various stone models and matrices utilized in fabrication of the final appliances, are mounted on positioning instruments in a manner to assure that the proper relationship between the dentures is maintained throughout the tissue treatment period and without loss of the proper functional relationship of the temporary dentures employed, regardless of the length of time of the treatment procedure. An important part of this object is to facilitate the insertion and placement and configurations of tissue treatment material in the dentures by the novel use of these stone models while they are mounted in their correct relationship on the jigs, articulators or other instruments while tissue treatment material is on the dentures.

It is still another aim of the present invention to provide a method of treating a patient's edentulous tissue which lends itself particularly to taking of a dynamic impression of the patient's edentulous tissue after the same has been restored to a sound condition, by using the dentures themselves as impression trays and the tissue treatment material as an impression material whereby the impressions thus obtained represent the condition of the edentulous tissue and the relationship of the edentulous ridges under conditions of normal and functional use.

Apparatus and an effective procedure for constructing dentures which, from a technical standpoint, very accurately conform to the stone models of the patient's edentulous ridges, are disclosed in detail in U.S. Patents No. 2,887,717 and No. 2,899,712.

Thus, a still further important aim of this invention is to provide a method of facilitating construction of dental appliances so that the same accurately conform, from a clinical standpoint, to the patient's edentulous ridges by first restoring the tissue to a sound physiological condition, and with the dentures operating in true functional relationship, wherein the patient's upper existing teeth or upper denture are utilized as a reference point, and then the most normal position of the lower existing teeth or denture ascertained with respect to the upper teeth and this relationship then retained throughout the tissue treatment process, so that the final denture or dentures constructed from the functionally obtained impressions will not only accurately conform to the patient's edentulous ridges, but the teeth will also work in true harmonious relationship for the most comfortable fit for the patient.

Other important objects and details of the present process and apparatus will become obvious or be explained in greater detail as the following specification progresses.

Figure 6:
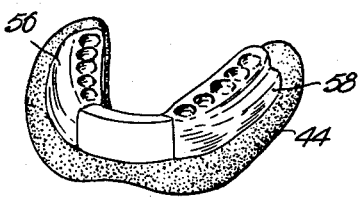
FIG. 6 is a perspective view of the denture base as shown in FIG. 5 but showing the teeth impressions formed therein after the patient has swallowed to obtain a true functional impression of the teeth in natural harmonious relationship.
Figure 7:
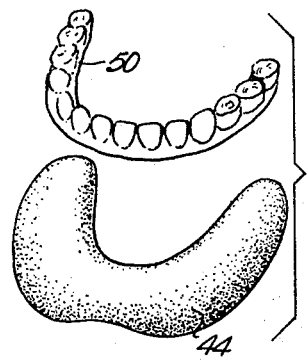
FIG. 7 is a perspective view of the denture base as shown in FIGS. 4 to 6 inclusive, but with the wax member removed therefrom, and showing the way in which temporary plastic teeth may be secured to the denture base on the upper portion thereof.
Figure 8:
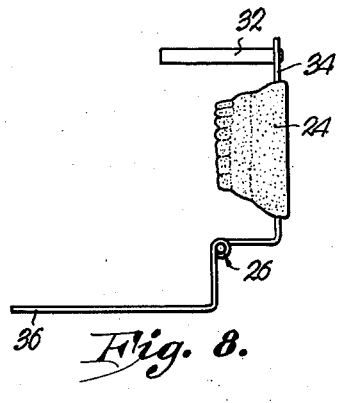
FIG. 8 is a schematic representation of another positioning instrument utilized in the present process, and showing a stone model of the patient's upper denture or of his existing upper teeth, mounted in place on the upper section of the instrument.
Figure 10:
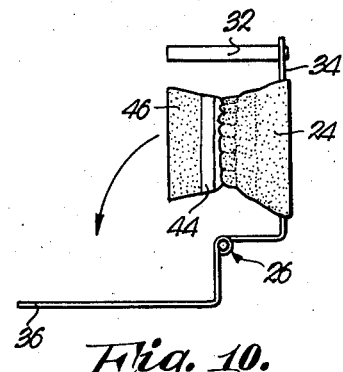
FIG. 10 is a schematic representation of the instrument as shown in FIG. 9, but with the denture base and edentulous ridge model as shown in FIG. 9, being occluded to the model illustrated in FIG. 8.
Figure 11:
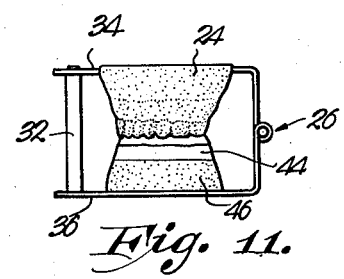
FIG. 11 is a schematic representation of the instrument and the components mounted thereon as shown in FIG. 10, but with the sections of the instrument being closed and the lower edentulous ridge model secured to the lower section of the instrument.
Figure 12:
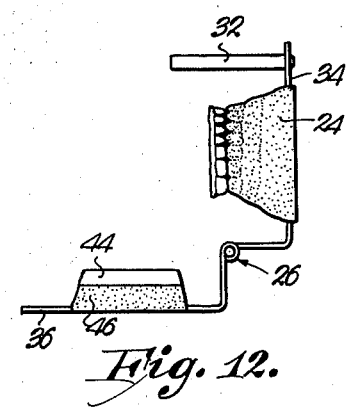
Figure 13:
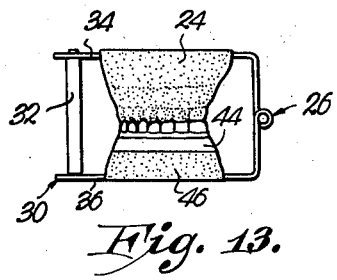

FIG. 12 is a schematic representation of the positioning instrument as shown in FIGS. 8 to 11 inclusive, but with the members of impressionable material shown in FIG. 6 removed from the denture base, and with the plastic teeth element shown in FIG. 7, occluded to the model of the denture or existing upper teeth as shown in FIG. 8; and FIG. 13 is a schematic representation of the positioning instrument and components as illustrated in FIG. 12, but with the instrument being closed to permit fastening of the plastic teeth to the lower denture base in proper disposition thereon.

It is apparent that when a soft tissue treatment material is inserted in the dentures and the appliances are thereupon inserted directly into the patient's mouth, the relationship of the dentures, one to the other, can be lost as the dentures position themselves in the patient's mouth. The dentures will not necessarily position themselves in exactly the same location each time a new treatment or impression material is placed on the dentures before they are inserted in the patient's mouth. The overflow of tissue treatment material, when it is inserted in this old manner, will stick to the patient's mouth, ooze down the patient's throat, and is otherwise objectionable to both patient and dentist. In the present method, the tissue treatment material is applied to the dentures and the dentures seated on stone models of the edentulous ridges that have been mounted on positioning instruments so that the treatment composition is molded into a very close configuration of the patient's edentulous tissue in a manner that would not be possible if the appliances were simply inserted in the patient's mouth after placement of the treatment material therein. Since the treatment material has been pre-molded to fit the models of the patient's edentulous tissue, and since the excess treatment material has been removed while the dentures were on the models and prior to placement in the patient's mouth, the dentures are no longer free to shift in the patient's mouth upon placement of the dentures against their respective edentulous ridges and there is no obnoxious or uncomfortable flow of excess material.

The method of treating a patient's edentulous tissue in accordance with the concepts of the present invention, will first be described with reference to the circumstances where the patient has a set of upper and lower dental appliances which do not fit properly either because they do not conform to the patient's gums or the edentulous ridges are in poor physiological condition.

Conventional static impressions are taken during the first visit, of the patient's edentulous upper and lower gums utilizing conventional impression procedure. Generally, this involves inserting a tray in the patient's mouth and having impression material thereon so that upon pressing of the material against the patient's edentulous ridges, a suitable impression conforming closely to the patient's gums will be formed in the material. Impressions are also taken in separate trays utilizing any suitable type of impression material, of the patient's existing upper and lower dentures. Stone models of three of these impressions are then poured utilizing conventional techniques. The stone model 20 of the patient's upper edentulous ridge is mounted on the positioning jig 22 while the model 24 of the existing upper denture is secured to the positioning jig 26 as indicated in FIG. 8. Each of the positioning instruments 22 and 26 may have a pair of hingedly interconnected generally L-shaped sections 28 and 30. A spacing rod 32 mounted on the outer extremity of the leg 34 of the section 28, and normally extending toward the leg 36 of the opposite section 30, serves to maintain legs 34 and 36 in parallel relationship when a corresponding jig is closed. It is to be understood that the jigs 22 and 26 as illustrated are exemplary of operable apparatus only, since articulators or other mounting instruments may be used with equal facility.

In order to assure that the dentures will be in true functional alignment during treatment of a patient's edentulous tissue, it is desirable that true functional relationship of the patient's jaws be obtained and this information placed on the positioning jigs 22 and 26. Although a number of different conventional procedures may be employed to establish the proper relationship between the patient's jaws, superior results have been obtained using the following steps.

Figure 4:
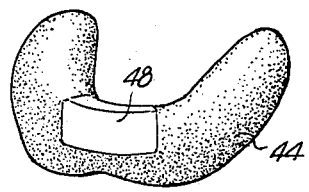
FIG. 4 is a perspective view of a lower provisional denture base with a strip of wax on the anterior portion thereof.

A lower provisional denture base designated 44 is constructed on the model 46 of the patient's lower edentulous ridge by painting the ridge defining surfaces thereof with an acrylic resin material which is conventionally used in the dental profession for fabrication of artificial dental appliances. A strip of wax 48 serving as a speaking vertical is secured to the anterior portion of the upper surface of the provisional denture base 44, as shown in FIG. 4, with the height of the strip 48 being somewhat greater than the normal height of the front teeth to be ultimately mounted on the front portion of denture base 44. A synthetic resin teeth rim element 50 is also prepared corresponding to the teeth which initially are present on the patient's existing lower denture, or the old lower denture itself may be used by relieving the base so it can be repositioned into the newly established jaw relationship. The teeth rim element 50 is prepared by pouring polymerizable synthetic resin material into the impression (not shown) of the patient's existing lower denture. A matrix 52 (FIG. 2) is also prepared at this time, of the occlusal teeth surfaces of the patient's existing upper denture 54.

Figure 1:
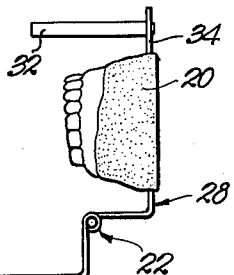
FIGURE 1 is a schematic representation of a positioning instrument used to advantage in the instant process of facilitating the construction of dental appliances, and illustrating an upper edentulous ridge model and an existing upper denture mounted on the model, with one section of the positioning instrument being illustrated in an open position.

Since impressions only were taken during the patient's first visit, at the second visit the first step by the dentist involves adjusting the upper denture 54 by removing the undercuts and the peripheral surfaces thereof, and possibly relieving the muscle channels and frenum so that the denture base 54 will fit readily on the ridge defining surfaces of model 20 as illustrated in FIG. 1.

The edentulous ridge defining surfaces of model 20 are then coated with a conventional dental separating agent. A quantity of a tissue treatment composition is prepared and poured onto the inner surface of the provisional denture base 44 with sufficient material being used to provide a flowable coating on the denture of approximately 3 millimeters in thickness. A somewhat thinner coating may be used in certain instances, but in order for dependable results to obtain, the coating should be at least 0.1 millimeter in thickness.

The tissue treatment composition is applied to all surfaces of the denture base 44 which normally come into contact with the edentulous riges and other oral tissues of the patient's mouth, to thereby provide a coating of generally uniform thickness between the denture and the gums and surrounding areas of the wearer's mouth. The tissue treatment composition is somewhat less viscous when it is applied than it will be a short time later, however, it is of such nature that it will remain pliable for an extended period of time with only very slight hardening of the same taking place in a period of the order of 3 to 5 days.

The tissue treatment composition is preferably a copolymer formed from an admixture of ethyl methacrylate and butyl methacrylate, and employed in conjunction with a plasticizer therefor as well as a quantity of a nontoxic solvent such as ethyl alcohol. In the preferred formulation, 9 parts by volume of ethyl methacrylate to 1 part by volume of butyl methacrylate are copolymerized and the resulting polymer is reduced to powdered form of a particle size whereby all of the material will pass through an 80 mesh screen. The powder is then mixed with predetermined amounts of the plasticizer and a solvent in order to produce a treatment composition of required characteristics. For purposes of illustration only, a suitable composition is found to be 1¼ parts by volume of the powdered polymer and 1 part by volume of a liquid including the plasticizer and the solvent. A preferred plasticizer has been found to be butyl phthalyl butyl glycollate with 3 parts by volume of the latter being added to each 1 part by volume of ethyl alcohol.

Although a copolymer of butyl methacrylate and ethyl methacrylate has been found to give the best results as a treatment composition as described, it is to be understood that other equivalent synthetic resins may be employed, as for example, butyl or ethyl methacrylate alone, finely divided styrene, vinyl acetate, cellulose acetate, cellulose nitrate and various other acrylic resins. Under all conditions, the treatment composition, upon application thereof to the appliance, should have viscosity such that the material will be deformed by a pressure not appreciably greater than 85 millimeters of mercury, but will not be so fluid that the same will be pushed out from under the dental appliance 54, not conform accurately to the patient's mouth, or insufficient to retain the dental appliance in the patient's mouth in proper position and at a proper required attitude. Thus, the treatment composition is understood to have a consistency capable of being deformed under a pressure not substantially greater than the patient's diastolic blood pressure and characterized by the property of retaining such consistency for an extended period of at least 3 to 5 days. In this respect, the amount of plasticizer should be correlated with the particular resin employed to give the desired results as outlined. Various plasticizers are suitable for the subject purpose provided that the same are compatible with the particular resin and are nontoxic. Diphenyl phthalate may be used with polystyrene in lieu of butyl phthalyl butyl glycollate. Methyl phthalyl ethyl glycollate, ethyl phthalate ethyl glycollate, dibutyl phthalate and a mixture of ortho and para toluene ethyl sulfonamides may all be used with polyvinyl acetate. These same plasticizers may be used with equal results with cellulose acetate and cellulose nitrate.

Figure 2:
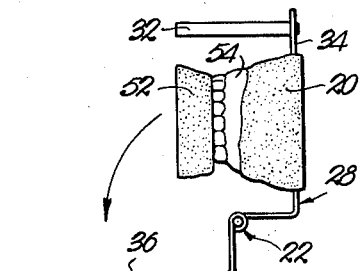
FIG. 2 is a schematic representation similar to FIG. 1 but illustrating a matrix of the occlusal teeth surface of the upper denture located in occluded relationship with respect to the denture.
Figure 3:
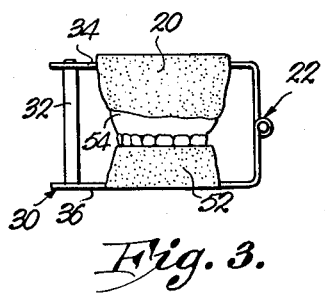
FIG. 3 is a schematic representation of the instrument as shown in FIGS. 1 and 2, but with the sections thereof being in closed relationship and with the matrix of the occluded surfaces of the upper denture being secured to the lower section.

The tissue treatment material increases in viscosity after application thereof to the upper denture 54, and after a short period of time, will have a smooth consistency after setting up to a partially jelled condition. The denture base 44 is then positioned on the model 20 in disposition as illustrated in FIG. 1 and the matrix 52 of the occlusal surfaces of the upper denture 54 is occluded thereto as shown in FIG. 2. Section 28 of jig 22 is then swung downwardly into the closed disposition of the same as illustrated in FIG. 3, whereupon the matrix 52 is secured to the leg 36 of section 30. Any tissue treatment material which is forced out from under the denture base 54 is removed therefrom and this can be accomplished either with the denture still in the jig 22, or after removal of the base 54 from model 20.

Another mix of the treatment composition using 1 part by volume of powder to 1 part by volume of the liquid is prepared and after slight thickening of the composition, the mixture is applied to all defects on the coated surface of the denture base. Additionally, a bead is applied to the inner surface of the denture 54 along a line about ⅛ inch from the crest of the border of the denture to the outside of the tissue bearing area. Care should be exercised in applying the bead so that it is possible to register the border extensions and other dictates of both the muscle and the tissue.

Upon removal of the coated upper denture 54 from model 20, the denture is then inserted in the patient's mouth. By virtue of mounting of the coated denture on the base 20 prior to insertion of the base 54 in the patient's mouth, the dentist is assured that the denture is returned to the patient's mouth in a stable manner and that its location therein will be identical each time it is replaced.

Next, the lower provisional denture base 44 is inserted in the patient's mouth and stabilized therein with denture adhesive if necessary. With the patient in a standing position, he is instructed to count from 1 to 10 in a normal but reasonably spirited manner. Each time the patient enounciates the numeral 6, the dentist observes the location of the upper margin of the speaking vertical 48 with respect to the lower extremities of the front teeth on denture base 54, and the upper edge of the wax vertical 48 is trimmed with a knife until 2 millimeters of clearance is provided between the upper edge of the vertical and the lower extremity of the patient's upper denture teeth when the number 6 is enunciated.

Figure 5:
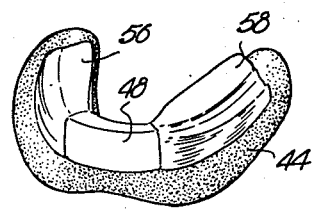
FIG. 5 is a perspective view of the denture base as shown in FIG. 4, but with a pair of wax members being provided on the posterior portion of the denture base on opposite sides of the speaking vertical.

After establishment of the proper height of the speaking vertical 48, provisional denture base 44 is removed from the patient's mouth and two soft wax members 56 and 58 are placed on the upper surface of the denture base 44 on the posterior portions thereof as illustrated in FIG. 5 and thereby located on opposite sides of the speaking vertical 48. The upper surfaces of the wax members 56 and 58 should be located in generally parallel relationship to the upper margin of the vertical 48. The wax rim on provisional denture base 44, and defined in major part by the members 56 and 58, should be adjusted so that they are not too bulky, whereupon the provisional denture is then returned to the patient's mouth. The dentist then advises the patient to close his teeth thereby resulting in the teeth of the upper denture 54 making suitable impressions in the upper surfaces of wax members 56 and 58. The dentist observes the relative relationship between the front teeth of the upper denture 54 and the speaking vertical 48, and the patient is requested to continue closing his teeth until the required 2 millimeters of freeway space is obtained between the upper edge of the vertical 48 and the lower extremities of the front teeth of denture 54.

The provisional denture base 44 is then removed from the patient's mouth and excess occlusal wax is removed from the wax members 56 and 58 utilizing a sharp knife. The soft wax is trimmed away from members 56 and 58 until only the imprints of the tips of the upper denture teeth are visible in the wax. The tooth imprints in wax members 56 and 58 are smoothed off with a warm wax iron without reducing the height of the members and in conjunction with smoothing of all edges to bring the wax bite rim to a contour substantially equal in size and shape to the teeth that will ultimately be attached to the upper surface of the denture base 44.

Next, with the upper denture 54 still in place in the patient's mouth, the provisional denture base 44 having the wax bite rim 48 thereon, is returned to the patient's mouth with more denture adhesive being utilized if necessary, and without any interference between the denture bases, when in the mouth, in order to prevent an error in the jaw registration. The patient is then instructed to talk or read aloud while the dentist closely observes his jaws. As soon as he swallows and registers the impression of the opposing teeth, the dentist instructs the patient to open his mouth and the lower denture base 44 is removed. If deemed desirable, the dentist may ask the patient to drink a quantity of a warm beverage which will require his swallowing to thereby make an imprint of the teeth of the upper denture 54, in the posterior portion of the upper surface of the wax members 56 and 58 on denture base 44. During the normal and reflexive act of swallowing, the jaws will always be closed past the normal rest position and, at the point of their furthest closure, the occlusal surfaces of the teeth will gently meet. Thus, the impressions formed in the soft wax members 56 and 58 of the tips of the teeth on the upper denture 54 will represent the exact normal occlusion of the teeth and proper functional relationship of final dentures to be fabricated for the patient. It is to be understood that the wax bite rim 46 defined by wax members 56 and 58, and speaking vertical 48, should conform as closely as possible to the actual shape of the teeth to be mounted on provisional denture base 44, since the neural mechanism can report information only in relationship to what it finds in the mouth at a particular time. A large glob of wax on the provisional denture base 44 would lead to a false report and give inaccurate results.

Figure 9:
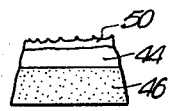
FIG. 9 is a schematic representation of the denture base as illustrated in FIG. 6, mounted on a model of the patient's lower edentulous ridges.

The lower provisional denture base 44 is then mounted on the model 46 of the lower edentulous ridge as indicated in FIG. 9, and the complete assembly is occluded and attached to the model 24 of the patient's upper denture as shown in FIG. 10. Jig 26 is closed and the model 46 secured to the leg 34 of the lower section 30 of jig 26.

Next, the jig is reopened as shown in FIG. 12, and the wax bite rim defined by members 56 and 58 as well as vertical 48, removed from lower provisional denture base 44. The plastic teeth element 50 is then occluded to the model denture 24 as indicated in FIG. 12, whereupon the jig 26 is then reclosed as shown in FIG. 11 so that the element 50 may be suitably secured to the lower provisional denture base 44 employing conventional denture material of the type utilized in constructing base 44.

During the third visit of the patient to the dentist, the undercuts or areas of excessive impingement on the lower provisional denture base 44 are relieved and the model 46 of the lower edentulous ridge coated with a dental separating material of the type previously mentioned. Another mixture of the treatment composition comprised of 1¼ parts by volume of powder and 1 part by volume of liquid, is prepared and then placed over the inner surface of the dentures 44 and 54 to provide a uniform coating of a thickess of the order of 3 millimeters. The coated provisional denture 44 is assembled on the jig 26 on the model 46 and the jig closed to cause the treatment composition to assume the configuration of the edentulous ridge defining face of model 46. Likewise, the coated denture 54 is assembled in jig 22 as shown in FIG. 3. The provisional denture bases 44 and 54 are then removed from respective jigs, and excess treatment composition removed from the peripheral edges thereof, and a bead of additional treatment composition placed around the borders of the dentures in a manner set forth. The apparent defects in the treatment composition coating should be touched up with a quantity of the treatment material formed of 1 part by volume of powder to 1 part by volume of liquid as specified, whereupon the provisional dentures should then be returned to the patient's mouth.

It is apparent that since the upper denture 54 and the lower provisional denture base 44, having treatment composition thereon, are mounted in the jigs prior to positioning of the dentures in the patient's mouth, the treatment composition is molded into proper configuration with the patient's jaws in disposition for proper occlusion of the teeth, in a manner which would not be possible if the appliances were simply inserted in the patient's mouth afte placement of the coating composition thereon. Since the treatment material is relatively soft, the dentures would be free to shift in the patient's mouth after placement of the plates against respective edentulous ridges, and therefore the teeth would not, in most instances, be in proper functional alignment.

The patient is instructed to wear the coated dentures for 3 days utilizing the same in a normal manner and to then return to the dentist's office. Every 72 hours, even if the patient seems to be comfortable, the treatment composition is removed from the denture bases and replaced with fresh treatment composition in the same manner as described but with the dentures each being placed in the respective jigs prior to replacement of the appliances in the patient's mouth, to assure that the denture bases will remain in proper functional relationship throughout the treatment period. At the time of replacement of the treatment composition, the dentist should observe areas of impingement indicated by absence of the treatment material thereon, and these areas of the appliances should be relieved by scraping or grinding the resin therefrom in the manner of conventional adjustment of denture bases.

In order to permit visual observation of actual changes that are taking place in the patient's edentulous ridges because of the treatment thereof, the dentist takes an impression of the patient's edentulous ridges each time the patient returns to the office for replacement of the tissue treatment composition. When two successive impressions of the patient's edentulous ridges are identical, it is an indication that the tissue is physiologically sound and has returned to its normal condition. At this time, a dynamic impression can be taken of the edentulous ridges and the final dentures constructed.

The dynamic impression is taken by coating the upper denture 54 and the lower provisional denture base 44 with the tissue treatment composition set forth herein, and the dentures returned to the patient's mouth after jigging of the same as indicated, whereupon the patient is instructed to utilize the dentures functionally for a period of at least several hours and preferably including eating of one meal. The patient then returns to the dentist's office whereupon an impression is taken directly from the coated denture bases. Stone models are poured from these impressions. The final dental appliances may be constructed in a conventional manner from these stone models.

If the patient is dentureless at the time of commencement of the treatment procedure, then provisional denture bases are constructed for both the upper and lower edentulous ridges. The provisional dentures are used as treatment appliances until the patient's edentulous tissue has returned to normal condition whereupon functional impressions may be taken and final dentures constructed.

The present process is also usable for constructing single dentures where the patient's upper or lower teeth are in good condition, as well as for construction of partial dentures. For example, in the fabrication of an upper denture where the patient's lower teeth are in satisfactory condition, the steps set forth are followed with the exception that an upper provisional denture base is prepared and the jaw relationship impressions taken utilizing wax mounted on the upper provisional denture base. After establishment of the proper functional alignment of the provisional upper denture base with the patient's lower existing teeth, and employing the positioning jig to maintain the upper provisional denture base in alignment with the patient's lower teeth, a plastic teeth element corresponding to element 50 in FIG. 7 may be suitably mounted on the upper provisional denture base and the tissue treatment steps followed until the patient's upper edentulous ridge is restored to sound condition. Thereafter, a functional impression is taken and the final denture constructed from the stone model of the impression.

Having thus described the invention what is claimed as new and desired to be secured by Letters Patent is:

1. In a method of treating a patient's edentulous ridge tissue and with assurance that the occlusal surfaces of the teeth on a denture base for said edentulous ridge tissue will be in true functional relationship with respect to the occlusal surfaces of the patient's opposed teeth during the treatment, the improved steps of:
   (a) fabricating a model of the patient's edentulous ridge tissue;
   (b) fabricating a matrix of the patient's teeth opposed to said edentulous ridge tissue;
   (c) positioning the model and said matrix in relative dispositions causing the occlusal surfaces of said denture base to functionally occlude with the occlusal surfaces of said matrix when the denture base is located on said model;
   (d) placing a coating of treatment composition on the inner surface of said denture base which normally contacts the patient's edentulous ridge tissue, said tissue treatment composition being of a consistency capable of being deformed under pressure not substantially greater than the patient's diastolic blood pressure and characterized by the property of retaining such consistency for an extended period; and
   (e) mounting the coated denture base on the model and bringing the occlusal surfaces of the matrix into occlusion with the occlusal surfaces of the denture base prior to placement of the coated denture base in the patient's mouth.

2. In a method of treating a patient's edentulous ridge tissue and with assurance that the occlusal surfaces of the simulated teeth on a denture therefor will be in true functional alignment with the occlusal surfaces of the patient's opposed teeth during the treatment, the improved steps of:
   (a) fabricating a model of the patient's edentulous ridge tissue;
   (b) preparing a denture base which will fit readily on said model of the patient's edentulous ridge tissue and that is initially devoid of teeth simulating structure thereon;
   (c) fabricating a matrix of the patient's teeth opposed to said edentulous ridge tissue;
   (d) obtaining a functional impression in the patient's mouth of the occlusal surfaces of said teeth opposed to the patient's edentulous ridge tissue and in an impressionable material removably mounted on said denture base;
   (e) mounting the denture base on said matrix with the impressions in said material in occluded relationship to the teeth defining portion of the matrix;
   (f) constructing a teeth simulating element for mounting on said denture base;
   (g) replacing the material with said element while the denture base is maintained in proper relationship to said matrix;
   (h) placing a coating of treatment composition on the inner surface of said denture base which normally contacts the patient's edentulous ridge tissue, said tissue treatment composition being of a consistency capable of being deformed under a pressure not substantially greater than the patient's diastolic blood pressure and characterized by the property of retaining such consistency for an extended period;
   (i) mounting the coated denture base on said model while maintaining the occlusal surfaces of said element thereon in disposition for proper ultimate functional occlusion with the occlusal surfaces of the patient's opposed teeth; and
   (j) then placing the coated denture in the patient's mouth without substantially disturbing the impression formed in said coating by the model.

3. In a method of treating a patient's upper edentulous ridge tissue and with assurance that the occlusal surfaces of the simulated teeth on the denture therefor will be in true functional alignment with the occlusal surfaces of the patient's opposed teeth during the treatment, the improved steps of:
   (a) fabricating a model of the patient's upper edentulous ridge tissue;
   (b) mounting said denture on the model;
   (c) constructing a matrix of the occlusal surfaces of said simulated teeth on the denture;
   (d) positioning the matrix in a fixed disposition relative to the model causing the simulated teeth on the denture to properly occlude with said matrix when the denture is on said model;
   (e) placing a coating of treatment composition on the inner surface of said denture base which normally contacts the patient's upper edentulous ridge tissue, said tissue treatment composition being of a consistency capable of being deformed under a pressure not substantially greater than the patient's diastolic blood pressure and characterized by the property of retaining such consistency for an extended period;
   (f) mounting the coated denture on the model and then positioning the matrix and said model in said fixed disposition thereof with the matrix occluded to the simulated teeth on the denture; and
   (g) finally placing the coated denture in the patient's mouth without substantially disturbing the impression formed in said coating by the model.

4. In a method of treating a patient's edentulous ridge tissue and with assurance that the occlusal surfaces of the simulated teeth on a denture therefor will be in true functional alignment with the occlusal surfaces of the patient's opposed teeth during treatment, and employing a positioning unit having a pair of relatively shiftable mounting sections in predetermined spaced relationship when closed and movable toward and away from each other, the improved steps of:
   (a) fabricating a first model of the patient's edentulous ridge tissue;
   (b) preparing a denture base which will fit readily on said model of the patient's edentulous ridge tissue and that is devoid of teeth simulating structure thereon;
   (c) mounting a member of impressionable material on the upper surface of the denture base;
   (d) inserting the denture base in the patient's mouth;

(e) obtaining a functional impression in said member, of the patient's teeth opposed to said edentulous ridge tissue;
(f) fabricating a second model of the patient's teeth opposed to said edentulous ridge tissue;
(g) securing the second model to one of said mounting sections of the positioning unit;
(h) attaching the denture base to the second model with the impressions in the member in occluded relationship to the teeth simulating portion of the second model;
(i) placing the first model in complemental relationship to the lower surface of the denture base;
(j) attaching the first model to the other mounting section of the positioning unit while the latter is in a closed condition;
(k) shifting one of the sections away from the other section and then removing the member from said denture base;
(l) constructing a teeth simulating element for mounting on said denture base;
(m) placing the element against the teeth simulating portion of the second model in occluded relationship thereto;
(n) securing the element to the base after reclosing of the positioning unit;
(o) placing a coating of treatment composition on the inner surface of said denture base which normally contacts the patient's edentulous ridge tissue, said tissue treatment composition being of a consistency capable of being deformed under a pressure not substantially greater than the patient's diastolic blood pressure and characterized by the property of retaining such consistency for an extended period; and
(p) mounting the coated denture base on said first model while maintaining the occlusal surfaces of said element thereon in disposition for proper ultimate functional occlusion with the occlusal surfaces of the patient's opposed teeth prior to placement of the coated denture base in the patient's mouth.

5. A method as set forth in claim 4 wherein is included the step of removing the coated denture base from the patient's mouth after functional use thereof for an extended time, and removing a portion of the inner surface of the base at those areas thereof substantially free of said treatment composition and representing zones of excessive impingement of the patient's edentulous tissue against the denture base because of nonconformance of the latter to the edentulous ridge tissue configuration of the patient's mouth.

6. In a method of treating a patient's upper and lower edentulous ridge tissues with assurance that the occlusal surfaces of the simulated teeth on upper and lower dentures for respective edentulous ridge tissues will be in true functional alignment during the treatment, the improved steps of:
(a) fabricating models of the patient's upper and lower edentulous ridge tissues;
(b) preparing an upper denture base having structure thereon simulating upper teeth and which will fit readily on the upper edentulous ridge tissue model;
(c) constructing a lower denture base devoid of lower teeth simulating structure thereon and which will fit readily on the lower edentulous ridge tissue model;
(d) forming a matrix of the occlusal surfaces of the upper denture base;
(e) mounting a member of impressionable material on the upper surface of the lower denture base;
(f) inserting the upper and lower denture bases in the patient's mouth;
(g) obtaining a functional impression of the upper teeth structure in said member;
(h) fabricating a model of the upper denture base having said teeth simulating structure thereon;
(i) constructing a lower teeth simulating element;
(j) mounting the lower denture base on the model of the upper denture base with the impressions in the member in occluded relationship to the teeth simulating portion of said upper denture base model;
(k) replacing the member with said element while the lower denture base is maintained in proper relationship to said model of the upper denture base;
(l) placing a coating of treatment composition on the inner surfaces of said denture bases which normally contact respective edentulous ridge tissues, said tissue treatment composition being of a consistency capable of being deformed under a pressure not substantially greater than the patient's diastolic blood pressure and characterized by the property of retaining such consistency for an extended period;
(m) positioning the matrix in a fixed disposition relative to the upper edentulous ridge tissue model causing the teeth simulating structure on the upper denture base to properly occlude with said matrix when the upper denture is on the upper edentulous ridge tissue model;
(n) mounting the coated upper denture base on said upper edentulous ridge tissue model and then positioning the matrix and said upper edentulous ridge tissue model in said fixed disposition thereof with the the matrix occluded to the teeth simulating structure on the upper denture base prior to placement of the coated upper denture base in the patient's mouth;
(o) positioning the model of the lower edentulous ridge tissue in a fixed disposition relative to the upper denture base model causing the occlusal surfaces on the element to properly occlude with the occlusal surface defining portion of the upper denture base model when the lower denture base is on the lower edentulous ridge tissue model; and
(p) mounting the coated lower denture base on said lower edentulous ridge tissue model and then positioning the lower edentulous ridge tissue model and the upper denture base model in said fixed disposition thereof with the element occluded to the occlusal surface defining portion of the model of the upper denture base prior to placement of the coated upper denture in the patient's mouth.

7. In a method of treating a patient's upper and lower edentulous ridge tissues with assurance that the occlusal surfaces of the simulated teeth on upper and lower dentures for respective edentulous ridge tissues will be in true functional alignment during the treatment, and employing a pair of positioning units each having a pair of shiftable mounting sections in predetermined spaced relationship when closed and movable toward and away from each other, the improved steps of:
(a) fabricating models of the patient's upper and lower edentulous ridge tissues;
(b) preparing an upper denture base having structure thereon simulating upper teeth and which will fit readily on the upper edentulous ridge tissue model;
(c) constructing a lower denture base devoid of lower teeth simulating structure thereon and which will fit readily on the lower edentulous ridge tissue model;
(d) mounting a member of impressionable material on the upper surface of the lower denture base;
(e) inserting the upper and lower denture bases in the patient's mouth;
(f) obtaining a functional impression of the upper teeth structure in said member;
(g) fabricating a model of the upper denture base having said teeth simulating structure thereon;
(h) constructing a lower teeth simulating element;
(i) preparing a matrix of the occlusal teeth surface of the upper denture base;
(j) securing the upper edentulous ridge tissue model to one of the mounting sections of one of the positioning units;
(k) placing the upper denture base on the upper edentulous ridge tissue model in complemental relationship thereto;

(l) placing the matrix of the occlusal surface of the upper denture base against the teeth simulating structure of the upper denture base in occluded relationship thereto and securing said matrix to the other mounting section of said one positioning unit while the latter is in closed condition;

(m) securing the model of the upper denture base to one of the mounting sections of the other positioning unit;

(n) attaching the lower denture base to the model of the upper denture base with the impressions in said member in occluded relationship to the teeth simulating portion of the upper denture base model;

(o) placing the lower edentulous ridge tissue model in complemental relationship to the lower surfaces of the lower denture base;

(p) attaching the lower edentulous ridge tissue model to the other mounting section of the other positioning unit while the latter is in a closed condition;

(q) shifting one of the mounting sections of said other positioning unit away from the other mounting section thereof and removing the member from said lower denture base;

(r) placing the element against the teeth simulating portion of the model of the upper denture base in occluded relationship thereto;

(s) securing the element to the lower denture base after reclosing of said other positioning unit;

(t) removing the upper and lower denture bases from said positioning units and placing a coating of a treatment composition over the inner surfaces thereof, said composition being of a consistency capable of being deformed under a pressure not substantially greater than the patient's diastolic blood pressure and characterized by the property of retaining such consistency for an extended period; and (u) returning the coated denture bases to said one and the other positioning units respectively followed by closing of the latter before placing the coated denture bases in the patient's mouth in engagement with corresponding edentulous ridge tissues.

8. A method as set forth in claim 7 wherein is included the step of removing the coated base from the patient's mouth after functional use thereof for an extended time, and removing a portion of the inner surface of the base at those areas thereof substantially free of said treatment composition and representing zones of excessive impingement of the patient's edentulous tissue against the base because of nonconformance of the latter to the edentulous ridge configuration of the patient.

9. A method as set forth in claim 7 wherein said teeth simulating structure on the upper denture base is initially constructed of wax and generally conforms to the configuration of the final teeth to be provided on the upper denture base.

References Cited by the Examiner

UNITED STATES PATENTS 1,589,083 6/26 Alexander _____ 32—2
3,060,577 10/62 Smith _____ 32—17

RICHARD A. GAUDET, *Primary Examiner.*

ROBERT E. MORGAN, RICHARD A. GAUDET, *Examiners.*